United States Patent [19]

Van Leeuwen et al.

[11] Patent Number: 5,083,599

[45] Date of Patent: Jan. 28, 1992

[54] PROTECTIVE COVER DEVICE

[75] Inventors: Johannes T. Van Leeuwen, Wormerveer; Sytze Brouwers, Dokkum, both of Netherlands

[73] Assignee: Dunlop-Enerka B. V., Drachten, Netherlands

[21] Appl. No.: 474,455

[22] Filed: Feb. 2, 1990

[30] Foreign Application Priority Data

Feb. 3, 1989 [NL] Netherlands .................. 8900275

[51] Int. Cl.⁵ ............................................. A47H 1/00
[52] U.S. Cl. ............................................ 160/86; 384/15
[58] Field of Search .................. 160/86, 201; 52/169.7, 52/18, 19, 20; 384/15

[56] References Cited

U.S. PATENT DOCUMENTS

| | | | |
|---|---|---|---|
| 1,895,122 | 1/1933 | Benedict | 384/15 |
| 2,033,141 | 3/1936 | Kraut et al. | 384/15 |
| 2,303,438 | 12/1942 | Cornelius | 384/15 |
| 2,417,671 | 3/1947 | Armitage | 384/15 |
| 2,850,332 | 9/1958 | Begle . | |
| 3,475,064 | 10/1969 | O'Rourke . | |
| 4,867,578 | 9/1989 | Komiya | 384/15 |

FOREIGN PATENT DOCUMENTS

| | | |
|---|---|---|
| 942431 | 5/1956 | Fed. Rep. of Germany . |
| 3533767 | 4/1987 | Fed. Rep. of Germany . |

*Primary Examiner*—Blair M. Johnson
*Attorney, Agent, or Firm*—Young & Thompson

[57] ABSTRACT

Cover device for providing a displaceable cover above an opening, a flexible polymer belt which is substantially more rigid in respect of deflection in a transverse direction than in respect of a longitudinal direction, and a displaceable device disposed in the opening and delimited at both sides by the belt. The portion of the belt on both sides of the device is supported only on rollers disposed only adjacent side walls of the opening, whereby the belt is supported only along opposite longitudinal side edges thereof.

1 Claim, 1 Drawing Sheet

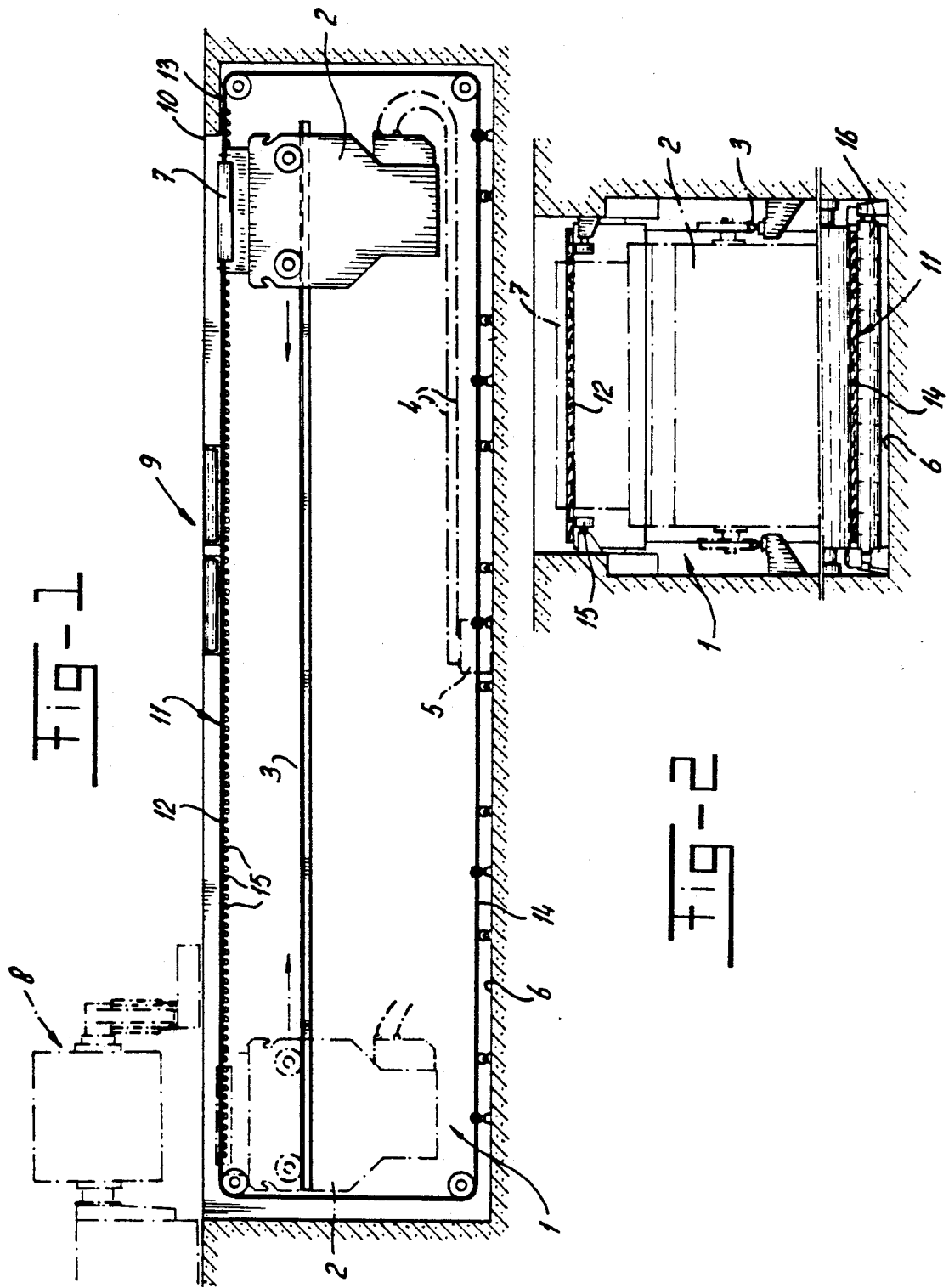

PROTECTIVE COVER DEVICE

The subject invention relates to a protective cover device to provide a displaceable cover above an opening, such as a cellar.

Such a device is known from DE-A-3 533 767, wherein a elastic sheet is described to which rigid slats are connected. Such a cover device can e.g. be used above cellars in which machines can move to and fro, such as transporting devices, at rolling equipment. Such devices convey material to be rolled from one station to another. To protect such machines as much as possible these are mounted in a cellar and its transport surface being substantially flush with the floor of the rolling device moves to and fro between the stations. To prevent that the space not occupied by the transport surface remains uncovered and a substantially danger arising for operators, as well as giving rise to the introduction of undesired materials into the cellar, a cover device is used. The device according to DE-C-942,431 is complicated, noisy and the guiding devices require considerable maintenance. Also such a cover will be subjected to considerable wear. In the device of DE-C-942,431 dirt will accumulate between adjacent slats. It has been found that if the length of such cover device does exceed 130 m vibrations can be generated during use.

The invention aims to obviate these drawbacks.

According to the invention this is realized in a cover device as described above in that the cover device comprises a flexible polymer belt being rigid in respect of deflection in the transverse direction. Such a belt is generally known in the art and explicitly reference is made to U.S. Pat. No. 4,957,199. According to this patent such a belt comprises a flexible polymer carrier body in which are disposed two layers which are rigid in respect of deflection in the transverse direction as well as at least one other layer providing longitudinal strength, wherein one of the layers imparting transverse rigidity is combined with the layer imparting longitudinal strength to form one layer consisting of longitudinal and transverse wires, while at least the transverse wires are made of high-modulus material. Of course also other polymer belts being rigid in transverse direction can be used for the subject invention. Such belts being rigid in transverse direction were up to now only used as conveyor belt, more particular for rolling side walks etc. being applied in airports etc. Surprisingly it has been found that such a belt can advantageously be used for covering of the opening moving to and fro. The rigid nature in transverse direction was of importance for the known applications to prevent that a person being on the belt would sense "waving" feeling at passing of the rollers extending over the total width of the belt. Because of using of a belt being rigid in transverse direction only rollers having a limited width at the sides of the belts are necessary. In the subject application the use of rollers having a limited width at the sides is of importance because so space can be provided for a device moving through the opening, such as the conveyor devices at rolling arrangements as described above.

According to a preferred embodiment of the cover device described above in the opening a displaceable device is provided and this device is bounded at both sides by the belt as described above. Therefore the opening is always covered. Furthermore said belt can be connected such that the opening, in which the device described above is placed can be maintained substantially constant. It is also possible to embody the belt having its two upper sides limiting an opening of variable size. So a device being below the upper surface of the opening can be completely hidden from sight by moving the two subsequent upper side parts towards each other. During the use of the device both upper parts are being moved from each other so that the device being within the cellar can be elevated.

According to a further preferred embodiment the belt comprises oil proof material. This is of inportance because the device being within the opening often operates with oil, which contact the belt by leaking. The guiding rollers for the belt being regid in transverse direction are according to a further preferred embodiment provided near the side walls of the opening to be covered. Because of that a device being inside the opening can move unrestricted to and fro. According to further preferred embodiment the belt comprises two upper sides and a lower side connecting these upper sides wherein the lower side is guided over rollers extending across the belt. These rollers extending across the width of the belt are provided on a location where they do not interrupt the functioning of the device being inside of the opening. To have them extend across the width a certain controlling effect of the belt is provided.

The invention will be further elucidated with reference to a further embodiment shown in the drawing, where:

FIG. 1 shows schematically and in side elevation a cellar having a cover device according to the invention, and FIG. 2 schematically in frontal view the device according FIG. 1.

In FIG. 1 a cellar is indicated with 1. In this cellar a schematically shown device 2 moves to and fro and runs over rails 3. Supply of the device 2 is provided through flexible cables 4, being fixed at 5 at the bottom 6 of the cellar 1. Device 1 has a supporting face 7, to convey a load, e.g. from a rolling device 8 to schematically shown rollers 9. Cellar 1 is provided with an opening 10, in which the support surface moves to and fro. To prevent that a portion of the opening remains uncovered, i.e. is not covered by support face 7, giving a danger for operators, and to furthermore to prevent that non desired material can be introduced, a belt generally referred to with 11, is provided. This belt provides upper sides 12 and 13 and lower side 14 connecting these sides. Upper sides 12, 13 are connected to the support face 7. During moving to and fro of the device belt 11, will move along such that the opening is continuously covered. The belt indicated with 11 is a belt being rigid in transverse direction, having at suspending near its extremities during loading in the middle only a small deflection. This is realised by the presence of layers giving transverse rigidly being spaced as much as possible in said belt. Because of that it is possible to only support the belt near its side extremities with rollers 15 as shown in FIG. 2. If a load is positioned in the middle of the belt it will not sag. To control the position of the belt in the lower part of the cellar rollers 16 are provided, which can extend across the width of the belt.

The belt being rigid in transverse direction being used here can have a surface profile being different from the usual ribbed profile of belts being rigid in transverse direction as used in coveyor belt applications. The belt comprises an oil proof polymer material, because for controlling of device 2 hydraulic oil is used which can leak on the belt. Instead of or additionally it is possible to provide a sheet above the lower side of the belt protecting his lower side against leaking of oil. Because of the flexible nature of the belt (generally reinforced rubber material) in constrast to the pallet-chain systems according to the prior art it is prevented that if large loadings for which the belt is not designed are placed on the belt deformation occurs which will remain. Because of that it is not often necessary to stop the device for maintenance. Thus in contrast to the structure according to the prior art indicated above the belts can have indefinite length because no problems with regard to noise and vibration will occur.

A comparative test showed that device according to the prior art when used in a rolling mill had to be overhauled at least each year. The belt according to the subject invention is at least five years free of substantial maintenance. This will mean a considerable increase in service time of the associated device. Futhermore the belt together with its auxiliary driving structure is about 20% cheaper than conventional devices. Although in the above an embodiment of the invention is described being preferred at the time being it has to be understood that many modifications can be introduced without leaving the range of the invention. E.g. it is possible to have the belt embodied as two parts, which can be on drums etc. It is possible to vary the size of the opening between zero and the width of the supporting face 7.

We claim:

1. Cover device providing a cover above an opening in a displacement way, the cover device comprising an elongate flexible polymer belt which is substantially more rigid in respect of deflection in a transverse direction than in respect of deflection in a longitudinal direction, and a displaceable device disposed in the opening and sides delimited at opposite sides thereof by said belt, longitudinal side edges of the belt on said opposite sides of said device being supported only on rollers disposed only adjacent transversely spaced side walls of the opening, said device. being disposed between said rollers on said transversely space sidewalls whereby the belt is supported only along said longitudinal side edges thereof and said device is movable in said longitudinal direction between said rollers.

* * * * *